United States Patent [19]
Bronnert

[11] Patent Number: 5,090,659
[45] Date of Patent: Feb. 25, 1992

[54] PRESSURE RESPONSIVE DIAPHRAGM CONTROL VALVE

[76] Inventor: Hervé X. Bronnert, 21495 Partridge Ct., Brookfield, Wis. 53005

[21] Appl. No.: 498,096

[22] Filed: Mar. 21, 1990

Related U.S. Application Data

[63] Continuation-in-part of Ser. No. 300,263, Jan. 19, 1989, Pat. No. 4,913,397.

[51] Int. Cl.$^5$ .............................. F16K 31/145
[52] U.S. Cl. .................. 251/61.1; 92/98 R; 92/103 M
[58] Field of Search ............... 92/98 D, 98 R, 102, 92/103 M, 103 R; 137/414, 437, 443; 251/45, 46, 61.1

[56] References Cited

U.S. PATENT DOCUMENTS

| | | | |
|---|---|---|---|
| 2,270,259 | 1/1942 | Burke | 92/102 |
| 3,083,943 | 4/1963 | Stewart, Jr. et al. | 251/61.1 |
| 3,100,002 | 8/1963 | Moore | 251/61.1 |
| 3,120,372 | 2/1964 | Gresham | 251/46 |
| 3,397,621 | 8/1968 | Groves | 92/103 R |
| 3,668,978 | 6/1972 | Bowen | 92/103 M |
| 3,693,649 | 9/1972 | Gordon et al. | 251/45 |
| 4,013,091 | 3/1977 | Hudson | 251/46 |
| 4,033,732 | 7/1977 | Axelsson et al. | 251/61.1 |
| 4,181,151 | 1/1980 | Ensign | 251/61.1 |
| 4,232,851 | 11/1980 | Johnson | 251/61.1 |

Primary Examiner—George L. Walton
Attorney, Agent, or Firm—Foley & Lardner

[57] ABSTRACT

A diaphragm control valve including a casing having an opening in one side, a cylindrical pipe mounted in a coaxial relation to the casing and having a flange forming a valve seat at one end, a flexible diaphragm symmetrically mounted in the casing in a spaced relation to the valve seat, and a cover mounted on one end of the casing forming a pressure chamber on one side of the diaphragm. The chamber is pressurized to move the diaphragm toward the valve seat to control the flow of fluid across the valve seat. A number of ports or slots are provided in the valve seat to relieve pressure buildup on the valve seat.

13 Claims, 4 Drawing Sheets

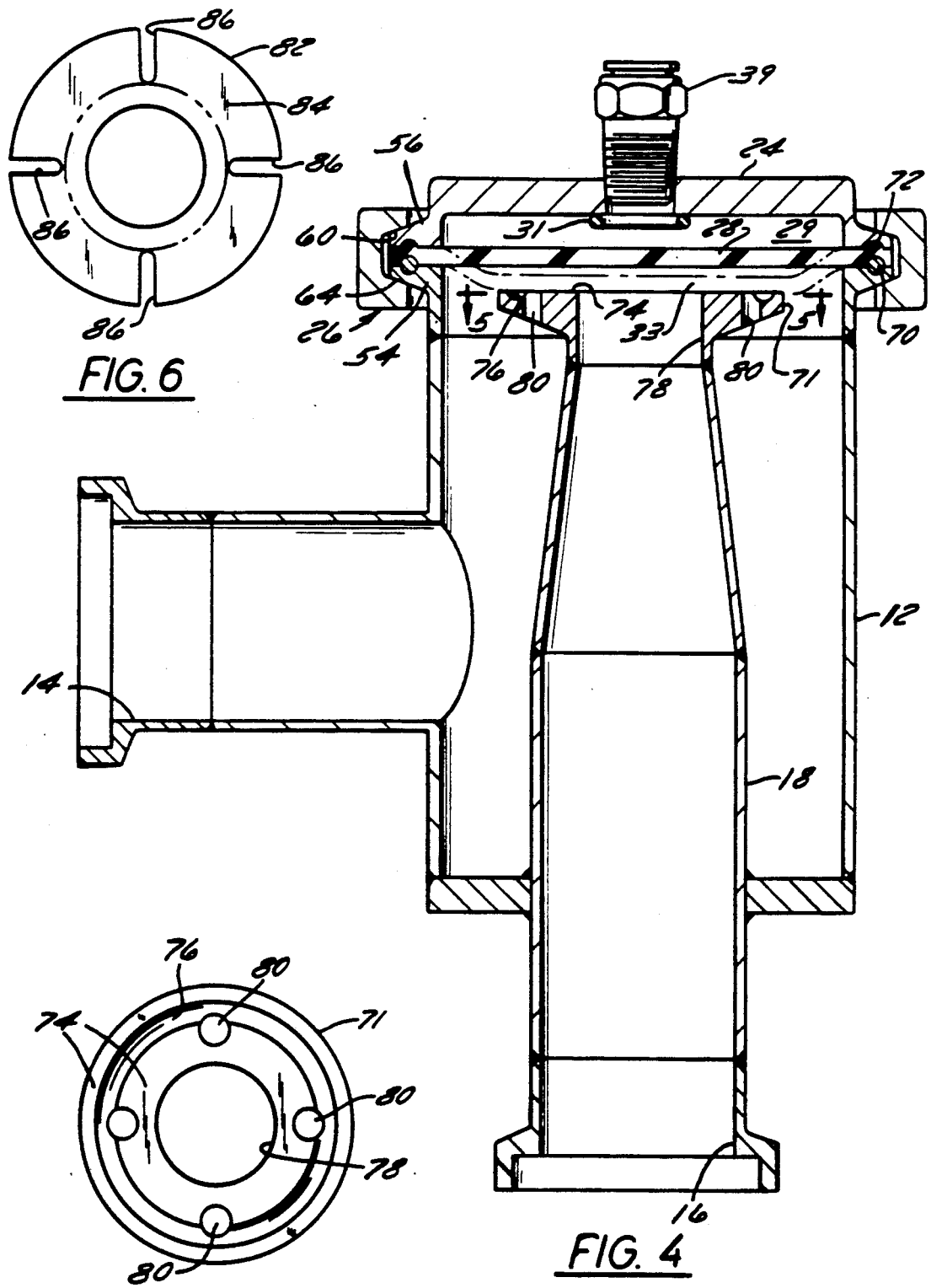

PRESSURE RESPONSIVE DIAPHRAGM CONTROL VALVE

RELATED APPLICATION

This application is a continuation in part of my earlier filed application entitled "High Pressure Control Valve" Ser. No. 07/300,263, filed on Jan. 19, 1989, now U.S. Pat. No. 4,913,397.

BACKGROUND OF THE INVENTION

1. Field of the Invention

The present invention relates to pressure responsive diaphragm type control valves for controlling the flow of liquid. More particularly, the valve includes an independent diaphragm which is responsive solely to the differential pressure between the control pressure and the pressure of the controlled fluid that flows through the valve.

2. Description of the Prior Art

Diaphragm type control valves are used to control all kinds of fluids. Generally, the valve includes a diaphragm for supporting a valve element for movement into and out of engagement with a valve seat. A valve stem is connected to the valve element to guide the movement of the valve element into and out of the engagement with the valve seat. Springs are often mounted on the valve stem to aid in opening or closing of the valve element. The movement of the diaphragm is, therefore, restricted by the mass of the valve stem, its friction, and the mass of the valve element and the bias of the spring. Diaphragm type control valves of the type contemplated herein position the diaphragm in a spaced relation to a valve seat with the diaphragm being moved by hydraulic or pneumatic pressure to close on the valve seat.

It has been found that at high pressures the flat valve seat, which cooperates with the diaphragm to control the flow of fluid, imparts a Coanda effect to the flowing liquid on the face of the valve seat at higher pressures. As the velocity of liquid increases across the surface of the valve seat, a Coanda phenomenon is generated. The phenomenon is believed to be due to a combination of circumstances: the change of direction of the flow of liquid across the valve seat; the confinement of this flow to the face of the valve seat; and the higher operating pressure of the fluid, 30 psig and up. The phenomenon produces a pulsating movement of the diaphragm which shocks the valve and associated piping. It is believed that the fluid sucks the diaphragm toward the valve seat due to the acceleration of the fluid across the valve seat. This produces a pressure build up on the diaphragm which forces the diaphragm open and thus producing another accelerating pulse of fluid across the valve seat and another cycling of the diaphragm.

SUMMARY OF THE PRESENT INVENTION

The diaphragm type back pressure valve according to the present invention is operated by balancing the pressure on one side of the diaphragm with the product flow pressure on the other side of the diaphragm. The pressure surface area of the diaphragm is larger than the surface area on the controlled portion of the product side of the diaphragm so that the diaphragm is responsive to small variations in pressure to control the flow and/or pressure of the fluid. A steady flow or pressure is provided by a flange having a flat valve seat with a groove in the valve seat concentric to the opening through the valve. This surface is advantageous in that it provides a double sealing zone with the diaphragm which is circular and symmetrically located with respect to the flange.

The Coanda phenomenon at high pressure has been eliminated by providing a series of holes or slots in the valve seat which are in communication with the groove in the valve seat and the downstream or low pressure side of the valve. The fluid cannot be accelerated across the face of the valve seat. The fluid pressure on the face of the valve seat is regulated by the holes or slots. The flow passes the face of the valve seat maintaining a steady space rather than sucking the diaphragm downward toward the valve seat.

A principal feature of the valve is the ratio of the diaphragm diameter to the product supply cross section diameter which provides a control pressure to product pressure ratio $1\frac{1}{2}:1$ to $2:1$.

A main advantage of the new valve seat is the strong support provided to the diaphragm by the valve seat in the closed position. With this arrangement the diaphragm is safe from wear or damage at any pressure.

Another feature is the inclusion of grooves or holes through the flange around the flat valve seat surface to relieve pressure and prevent vibration of the diaphragm due to the Coanda phenomenon.

A principal advantage of the flat valve seat, along with the concentric groove and fluid flow passages, is the increase in the operating range of the diaphragm valve from 10 psig up to 150 psig.

The diaphragm for the valve is completely symmetrical which allows for the use of both elastic type materials and resilient metal type materials.

A particular advantage of the valve is its versatility in that it can be used as a back pressure valve for controlling the pressure of the incoming fluid by any fluid operated diaphragm.

Another feature of the invention is that the only moving part in the valve is the diaphragm which enhances the sensitivity of the valve.

A further feature of the invention is the provision of a diaphragm valve which is symmetrically balanced and, therefore, can be controlled at low pressure with greater sensitivity.

A further feature of this invention is the ability to control large capacity flow of 150 gallons per minute or more, depending on size, with very high sensitivity particularly on the low pressure range of 1 to 25 psig.

Another feature of the valve is the ability to control pressure from a positive pressure feed pump, control flow and pressure from a centrifugal pump, and control flow and pressure from a pressurized feeding tank.

Other principal features and advantages of the invention will become apparent to those skilled in the art upon review of the following drawings, the detailed description and the appended claims.

BRIEF DESCRIPTION OF THE DRAWINGS

FIG. 4 is a side elevation view of the valve showing the cross section of the valve seat.

FIG. 5 is a view taken on line 5—5 of FIG. 4 showing the valve seat.

FIG. 6 is a view similar to FIG. 5 showing a modified valve seat.

Figure 1:
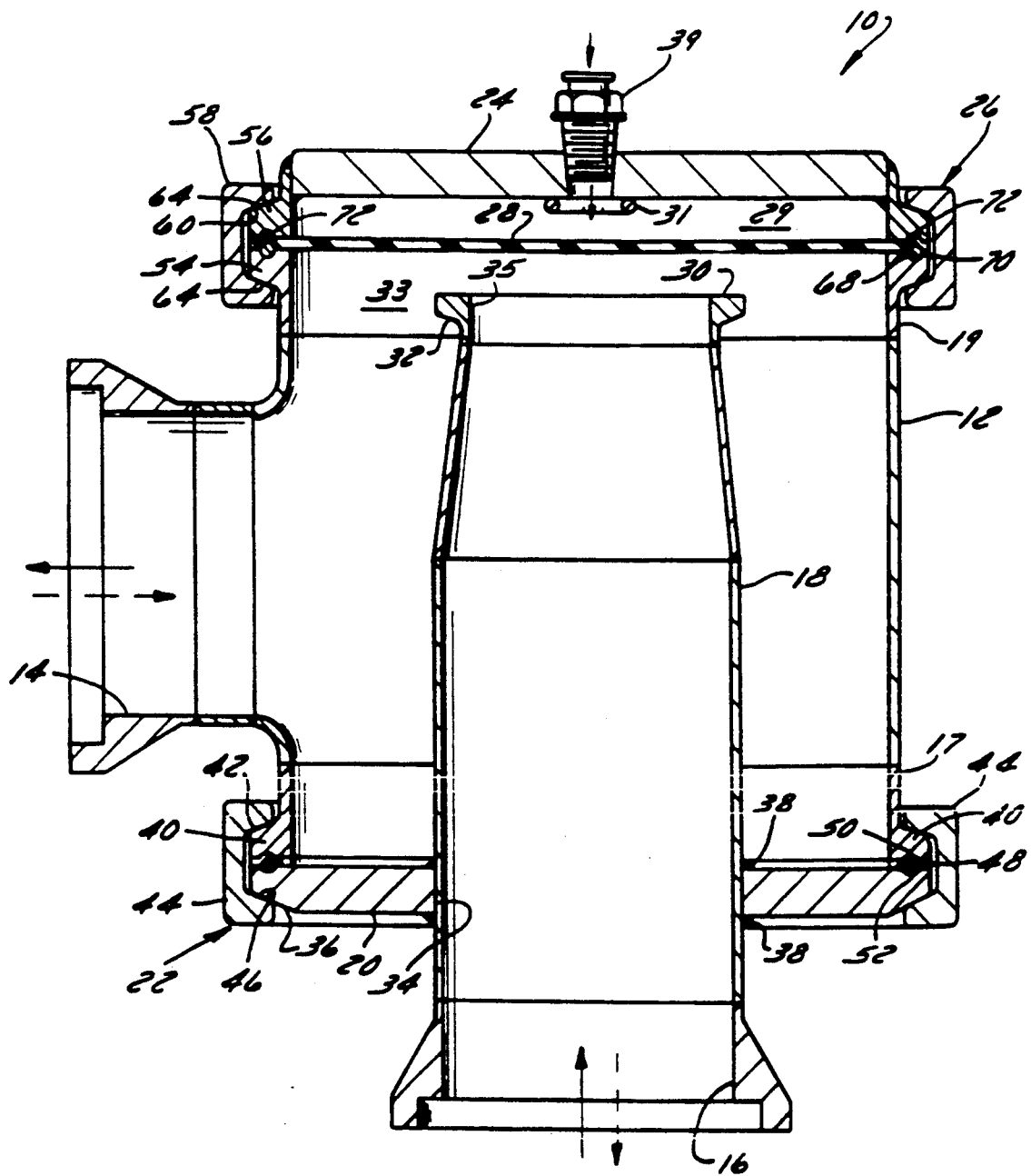
FIG. 1 is a side elevation sectional view showing the diaphragm located in a semi-open position with respect to the valve seat.
Figure 3:
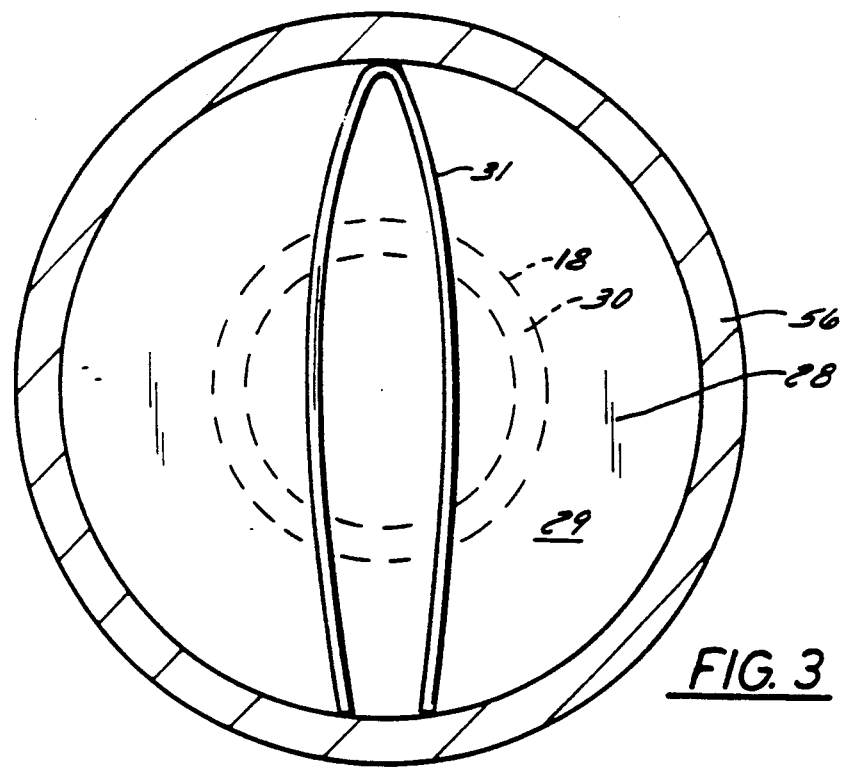
FIG. 3 is a view taken on line 3—3 of FIG. 2 showing the hair pin spring for preventing closing of the air inlet or damage to the diaphragm from it, if this item is needed.

Before describing one embodiment of the invention in detail, it is to be understood that the invention is not limited in its application to the details of construction, and the arrangement of the components set forth in the following description and illustrated in the drawing. The invention is capable of other embodiments and of being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

As seen in FIG. 1 of the drawings, the valve 10 includes a housing or valve body 12 having an outlet 14 on one side of the valve 12 and an inlet 16 at one end 17 of the valve body 12 disposed at a right angle to the outlet 14. Means are provided in the housing for forming a flat valve seat 30 in the housing intermediate the outlet 14 and inlet 16. Such means is in the form of a cylindrical pipe 18 which is supported in the housing 12 by a cover plate 20 seated on the end 17 of the housing 12.

The cover plate 20 is secured to the housing 12 by means of a clamp assembly 22. The valve body 12 is closed on the other end 19 by means of a cap 24 which is also secured to the valve body by means of a clamp assembly 26. Although tri-clover style clamp assemblies 22 and 26 are shown in the drawing, other assemblies may be used such as a cherry burrel assembly.

The cover plate 20 includes a central opening having a diameter greater than the diameter of the cylindrical pipe 18 and a chamfer 36 around the outer edge thereof. The cover plate 20 is secured to the cylindrical pipe 18 by welds 38. The end 17 of the housing 12 is provided with a lip 40 having a chamfer 42.

The cover plate 20 is secured to the lip 40 by a conventional tri-clover type clamp assembly 22 which includes a pair of 180° clamp members 44 having a V-shaped groove 46 and hingedly connected together at one end. The clamp members 44 are mounted on the chamfer 36 on the cover 20 and the chamfer 42 on the fitting 40 and connected together by means of a bolt and nut (not shown). Means may be provided for sealing the fitting 40 to the cover 20. Such means is in the form of a gasket 48 mounted in grooves 50 in the fitting 40 and groove 52 in cover 20. Although a clamp assembly has been shown and described, this joint could be welded if desired.

Figure 2:
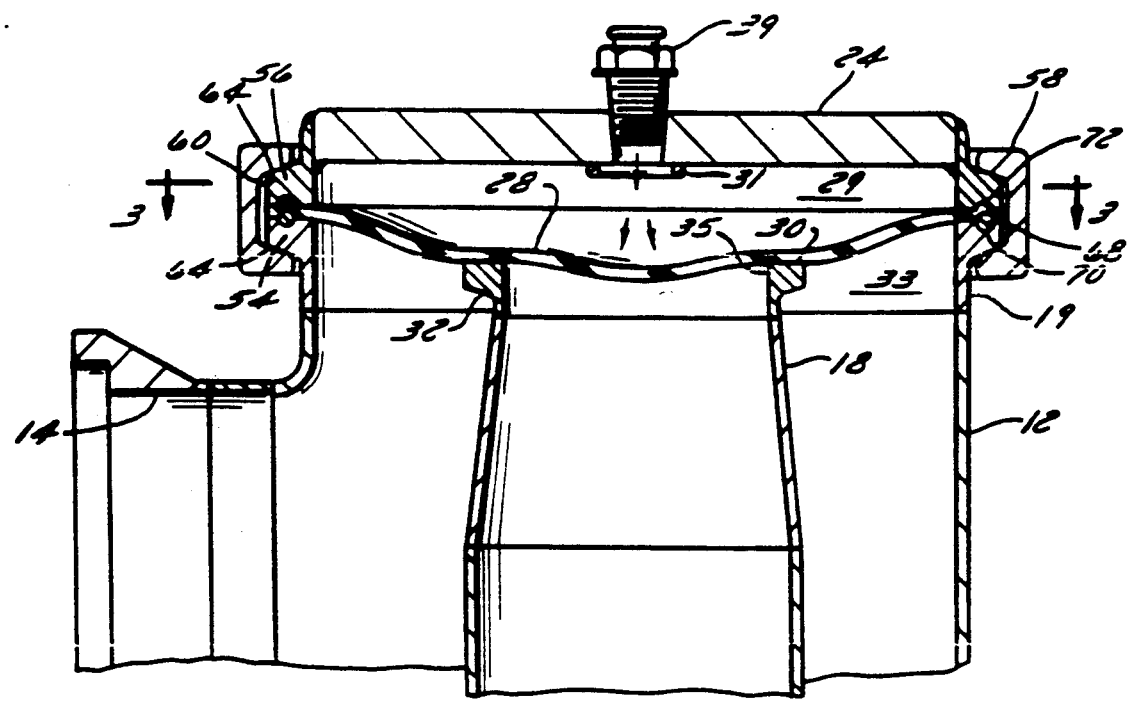
FIG. 2 is an enlarged view of the diaphragm, shown in section, in a closed position with respect to the valve seat.

Flow or pressure of fluid through the tube 18 is controlled by means of a flexible diaphragm 28 which is mounted in a spaced relation to the flat valve seat 30 provided on the end of a cylindrical ring 32 mounted on the end of the tube 18. The flow of fluid through the tube 18 in either direction of flow is controlled by moving the diaphragm 28 into engagement with valve seat 30 as shown in FIG. 2. Although flow through the valve has been described as flow from the inlet 16 to the outlet 14, it should be noted that flow can also be reversed through the valve as described hereinafter.

The diaphragm 28 is secured in the open end of the valve body 12 between an annular ferrule 54 mounted on the end 19 of valve body 12 and an annular ferrule 56 mounted on the cover 24. The ferrules 54 and 56 are clamped together by means of a conventional tri-clover clamp assembly 26. In this regard, the clamp assembly 26 includes a pair of 180° clamp members 58 are hingedly connected at one end. Each member 58 includes a V-shaped groove 60 that matingly engages the chamfered edges 64 provided on ferrules 54 and 56, respectively. The members 58 are drawn together at the other end by a clamp (not shown).

Means are provided for locking the diaphragm 28 between the ferrules 54 and 56. Such means is in the form of a metal ring 68 provided in a groove 72 in ferrule 56. A corresponding groove 70 is provided in ferrule 54. When the ferrules are clamped together, the diaphragm 28 will be forced into the groove 70 by metal ring 68 locking the diaphragm into the groove 70 and also forming a seal with the ferrule 54. It should be noted that the diaphragm 28 is normally suspended in the ferrules in an equally spaced relation to both the cover 24 and the valve seat 30.

With this arrangement, the seal on the casing side of the diaphragm 28 will provide an aseptic connection of the diaphragm 28 to the casing. It should be noted that the diaphragm 28 is symmetrically supported by the ferrules 54 and 56 so that an even distribution of force will be provided on actuation of the diaphragm. The diaphragm 28 is also spaced at substantially equal distances from both the cover plate or cap 24 and the flat valve seat 30. With this arrangement the stresses on the diaphragm are the same in both directions of motion. The diaphragm is prevented from being damaged or from blocking the end of inlet 39 by means of a wire loop spring 31 mounted on the inside of cap 24. The diaphragm 28 can be formed from a number of resilient materials such as Viton, Teflon, EPDM, silicon, stainless steel or monel. Although not shown in the drawings, the diaphragm can be controlled by conventional hydraulic pneumatic or hydro-pneumatic systems.

In the first or back pressure control mode, the product flows through the opening 16, the valve seat 30 and out through opening 14. The diaphragm 28 is controlled by air under pressure supplied through inlet 39 into chamber 29. The diaphragm 28 will move toward the valve seat 30.

In this regard it should be noted that the diameter of the diaphragm 28 is always larger than the diameter of the opening 35 in the valve seat 30. With this arrangement a lower control pressure can be used to control a higher fluid flow pressure from the incoming fluid. The diaphragm 28 can thus be used to control the incoming pressure or flow of the fluid passing through the tube 18. In order to stop the flow of product through the tube 18, the diaphragm must be moved into engagement with the flat valve seat 30. This is achieved by merely increasing the pressure in chamber 29 so that the pressure per square inch on the chamber side of the diaphragm exceeds the fluid flow pressure per square inch on the flow side of the diaphragm. As an example, a diaphragm having a diameter of two inches would require approximately one fourth the air pressure to close a valve seat of one inch in diameter.

When the valve is used to control the flow of fluid from the opening 14 through the opening 35 to tube 18, there is a general pressure balance which is different from use of the diaphragm 28 as in the first direction. With this type of flow, the product pressure fills the body of the valve 12 all around the tube 18 and acts on the diaphragm 28 only in the area 33 between the edge of valve seat 30 and the tri-clover style clamp 26. The control pressure to balance this fluid pressure needs to be higher pressure than the first approach since the incoming product in the housing does not flow directly against the diaphragm but at a 90° angle thereto.

This geometry brings a different action/reaction between the incoming fluid and the valve. The valve diaphragm is not directly subjected to quick pressure/flow changes since it is often positioned at 90° with the fluid inlet. In addition, the incoming fluid impact is broken up on the control pipe 18 and the internal body of the valve.

At pressures of 10 to 150 psig, a Coanda effect has been noted between the diaphragm 28 and the valve seat 30. The Coanda effect produces a vibrating motion in the diaphragm resulting in a pulsating flow of fluid through the line. This has been corrected by providing pressure relief ports 80 in the flange 71. In this regard and referring to FIGS. 4 and 5, an enlarged flange 71 is shown mounted on the end of the cylindrical pipe 18. The flange 71 includes a flat valve seat 74 with a groove 76 provided in the valve seat in a concentric relation to the opening 78 in the flange 71. Pressure relief ports 80 are provided in the flange 71 which communicate with the low pressure side of the valve and also with the groove 76.

With this arrangement a steady flow of fluid is achieved between the diaphragm 28 and the valve seat 74 on flange 71. As the fluid flows across the valve seat 74 any pulsating pressure surge will be relieved by the ports 80 which are located in the flange 71. In this regard it should be noted that the pressure of the fluid flowing between the diaphragm 28 and the flange 71 is relieved as the fluid flows across the ports 80. The pressure of the liquid flowing across flange 71 will be relieved through ports 80 in the event of a pressure variation which may occur as the fluid flows between the flange 71 and the diaphragm 28.

Figure 9:
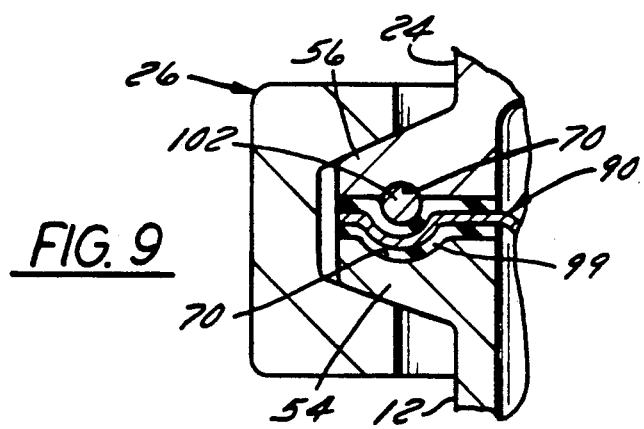
FIG. 9 is an enlarged view of a seal for the metallic diaphragm.
Figure 8:
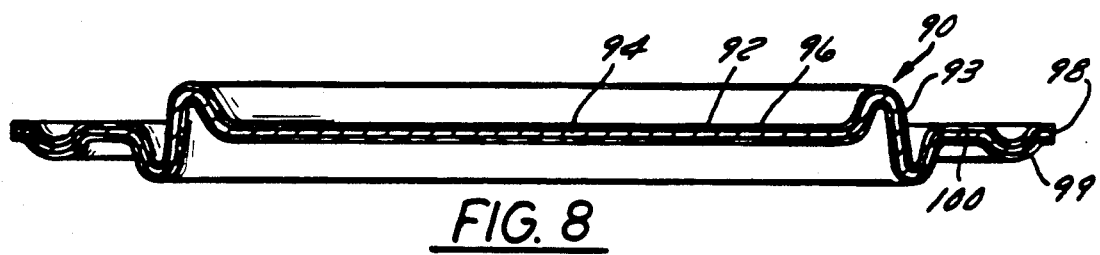
FIG. 8 is a cross section view of a coated diaphragm.
Figure 7:
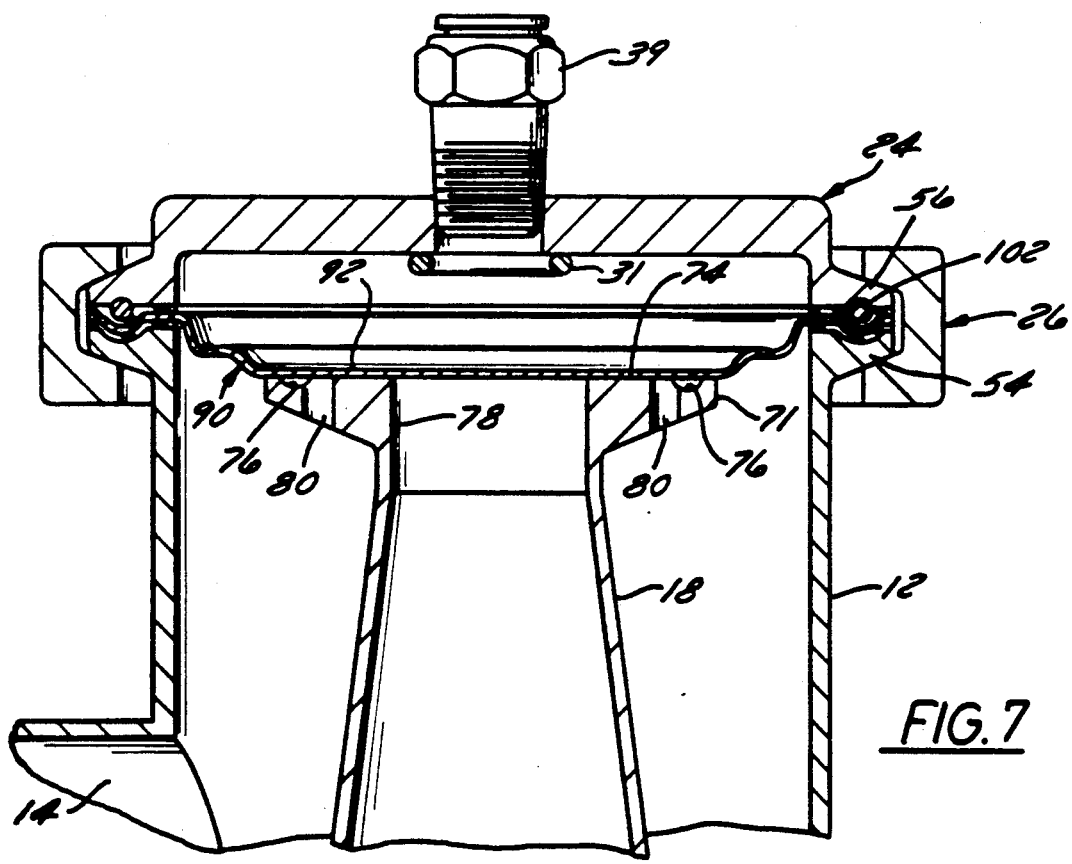
FIG. 7 is a side elevation sectional view of the valve with a metallic diaphragm on the valve seat.

Referring to FIGS. 7, 8, and 9, a flow control valve 90 is shown having a metallic diaphragm 92 for controlling the flow of fluid across the flange 71. Although a number of materials can be used to form the diaphragm, a stainless steel is preferred for this purpose. The flange 71 is shown with valve seat 74, a groove 76 and a number of ports 80. However, it should be noted that the metallic diaphragm could also be used with a valve seat 30 as shown in FIG. 1 for low pressure operation.

The diaphragm 92 as shown in FIG. 8 includes means for flexing the diaphragm 92 around the edges. Such means is in the form of a wave or S curve 93 which allows the center portion 94 to move into and out of engagement with the valve seat 74. A coating 96 can be provided on one or both surfaces of the diaphragm. Such coating may be either a plastic or rubberized material which will engage and seal the diaphragm to the valve seat.

The edges 98 of the diaphragm 92 are provided with a ridge 99 for sealing the diaphragm in the ferrules 54 and 56. In this regard and referring to FIG. 9, each of the ferrules 54 and 56 is provided with a groove 70. A metal ring 102 is positioned in the groove 70 facing the back of ridge 99. On assembly, the metal ring 102 will be forced into the back of the ridge 99 forcing one of the ridge 99 into the groove 70 in ferrule 54.

Referring to FIG. 6, a modified flange 82 is shown having a flat valve seat 84. A number of slots 86 are provided around the periphery of the flange 82 which connect the valve seat 84 with the low pressure side of the flange. The slot 86 prevents pressure surges from occurring by relieving the pressure of the fluid as it passes over the surface 84.

Thus, it should be apparent that there has been provided in accordance with the present invention a pressure responsive diaphragm control valve that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A diaphragm valve comprising:
   a cylindrical casing having an inlet opening at one end and an outlet opening in the side of said casing;
   a cylindrical tube coaxially mounted in said inlet opening in said casing;
   a radial flange mounted on said tube in a spaced relation to the inside of said casing to form an outlet flow path therebetween;
   a cap mounted on one end of said casing;
   a resilient diaphragm mounted between said cap and said one end of said casing in a spaced relation to said tube and to said cap;
   and means connected to said cap for selectively pressurizing said diaphragm into and out of engagement with said flange to control the flow of fluid across said flange, said flange including a number of pressure relief ports to prevent pressure surges between said flange and said diaphragm and thereby provide a steady flow of fluid to said outlet opening.

2. The valve according to claim 1 wherein said flange includes a groove concentric to said tube, said groove forming two valve seats on said flange.

3. The valve according to claim 2 wherein said diaphragm has a diameter larger than said flange and is symmetrically arranged with respect to said valve seats.

4. The valve according to claim 3 wherein said diaphragm is formed from a resilient elastic material.

5. The valve according to claim 3 wherein said diaphragm is formed from a resilient metallic material.

6. The valve according to claim 5 wherein said diaphragm has a coating on one side for sealing the diaphragm on the valve seat.

7. A diaphragm valve comprising:
   a tubular housing having an opening in one side;
   a cylindrical pipe mounted in a coaxial relation to said casing and in a perpendicular relation to said opening;
   said pipe forming a fluid flow path through said casing to said opening;
   a radial flange mounted on one end of said pipe, said flange forming a flat valve seat around the outside of said pipe, said flange including a number of pressure relief ports in said valve seat for relieving pressure surges to the outside of said pipe;

a flexible diaphragm mounted on one end of said casing with one side of said diaphragm located in a spaced relation to said valve seat;

a cover mounted on said casing to form a pressure chamber on the other side of said diaphragm;

and means for pressurizing said chamber to move said diaphragm into and out of engagement with said valve seat to control the flow of fluid across said flange, said pressure relief ports preventing pressure surges between said flange and said diaphragm.

8. The valve according to claim 7 wherein said diaphragm has a diameter larger than the diameter of said valve seat.

9. The valve according to claim 7 wherein said diaphragm is formed of metallic material.

10. The valve according to claim 9 wherein said diaphragm includes a flat gasket on each side for sealing the edge of the gasket with the casing and the cover.

11. A diaphragm valve comprising a casing, an opening in one side of said casing, a pipe mounted in said casing in a perpendicular relation to said opening, a radial valve seat mounted on one end of said pipe in a spaced relation to the inside of said casing, a resilient diaphragm mounted on said one end of said casing in a spaced relation to said valve seat, a cover mounted on said casing in a spaced relation to said diaphragm and means connected to said cover for selectively pressurizing the space between said diaphragm and said cover to move said diaphragm into and out of engagement with said valve seat, said valve seat including a groove around the surface of the valve seat and a number of pressure relief ports in said flange to relieve pressure surges which may occur as the fluid flows between said valve seat and said diaphragm.

12. The valve according to claim 11 wherein said diaphragm has a rubberized coating on one side for sealing the diaphragm on the valve seat.

13. The valve according to claim 17 including a gasket on the edge of each side of the diaphragm for sealing the diaphragm to said casing.

* * * * *